United States Patent [19]

Kawahara et al.

[11] 4,423,453
[45] Dec. 27, 1983

[54] MAGNETIC RECORDING MEDIUM

[75] Inventors: Hiroshi Kawahara; Hitoshi Azegami; Eiji Horigome, all of Tokyo, Japan

[73] Assignee: TDK Electronics Co., Ltd., Tokyo, Japan

[21] Appl. No.: 283,099

[22] Filed: Jul. 13, 1981

[30] Foreign Application Priority Data

Jul. 31, 1980 [JP] Japan .................. 55-105657

[51] Int. Cl.³ .................. G11B 23/00; B32B 7/02
[52] U.S. Cl. .................. 360/131; 428/212; 428/900
[58] Field of Search .......... 360/131, 134–135; 428/900–910, 212

[56] References Cited

U.S. PATENT DOCUMENTS 3,328,195 6/1967 May .................. 360/131 X
4,075,384 2/1978 Suzuki et al. .................. 360/131 X Primary Examiner—John H. Wolff
Attorney, Agent, or Firm—Oblon, Fisher, Spivak, McClelland & Maier

[57] ABSTRACT

A magnetic recording medium having two coated magnetic layers of a first magnetic layer and a second magnetic layer on a non-magnetic substrate. The first magnetic layer has a coercive force of 400 to 590 Oe and a thickness of 2.1 to 2.8μ and said second magnetic layer has a coercive force of 590 to 800 Oe and a thickness of at least 2.1μ.

2 Claims, 4 Drawing Figures

MAGNETIC RECORDING MEDIUM

BACKGROUND OF THE INVENTION

1. Field of the Invention

The present invention relates to a magnetic recording medium. More particularly, it relates to a magnetic recording medium having two coated layers which overcome disadvantages of a middle frequency distortion etc.

2. Description of the Prior Arts

An audio magnetic recording medium such as an audio cassette tape having excellent high frequency characteristics has been recently required. A magnetic recording medium having excellent high frequency characteristics has been also required in the case of the running at a low speed in a half speed deck or a microcassette etc. In general, it is necessary to use a magnetic powder having high coercive force to improve high frequency characteristics, however, when the magnetic powder having high coercive force is used, low frequency characteristics are usually inferior. The two coated layer type magnetic tape having improved magnetic characteristics has been proposed.

The conventional two coated layer type magnetic tape, has however, a large difference between the coercive force in the first layer and the coercive force in the second layer whereby a distortion of middle frequency characteristics is disadvantageously caused as a middle distortion phenomenon, though the low and high frequency characteristics are satisfactory. Thus, the original sounds are not faithfully reproduced to result reproduced sounds having distortions since the major components of the sounds in normal music are in the middle frequency range. Moreover, the output fluctuation is disadvantageously severe because the thickness of the second magnetic layer is relatively thin. Heretofore, the output fluctuation in relatively low frequency range such as 3 KHz, 8 KHz etc. has been seriously considered. Thus, it has been required to reduce the output fluctuation in high frequency range depending upon the requirement of the high frequency characteristics.

SUMMARY OF THE INVENTION

It is an object of the present invention to provide a two coated layer type magnetic medium which has smaller output fluctuation in high frequency range without distortion in the middle frequency range which is prepared by controlling thicknesses and coercive forces of first and second magnetic layers and a content of magnetic powder in the first magnetic layer.

The foregoing and other objects of the present invention have been attained by providing a magnetic recording medium having two coated magnetic layers which comprises a first magnetic layer having a coercive force of 400 to 590 Oe and a thickness of 2.1 to 2.8μ formed on a non-magnetic substrate and a second magnetic layer having a coercive force of 590 to 800 Oe and a thickness of at least 2.1μ formed on said first magnetic layer.

DETAILED DESCRIPTION OF THE PREFERRED EMBODIMENTS

Various two coated layer type magnetic recording media were prepared by forming a first magnetic layer (2) on a non-magnetic substrate (1) and forming a second magnetic layer (3) on the first magnetic layer (2) and they were tested. As a result, it is found that the effect of unevenness caused by fluctuation of thickness of the first magnetic layer (2) is reduced by coating the second magnetic layer (3) to be a certain increased thickness whereby it provides the two coated layer type magnetic recording medium having smaller output fluctuation in not only low frequency range as well as high frequency range.

Figure 1:
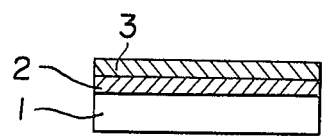
FIG. 1 is a sectional view showing a structure of a two coated magnetic layer type magnetic recording medium.
Figure 2:
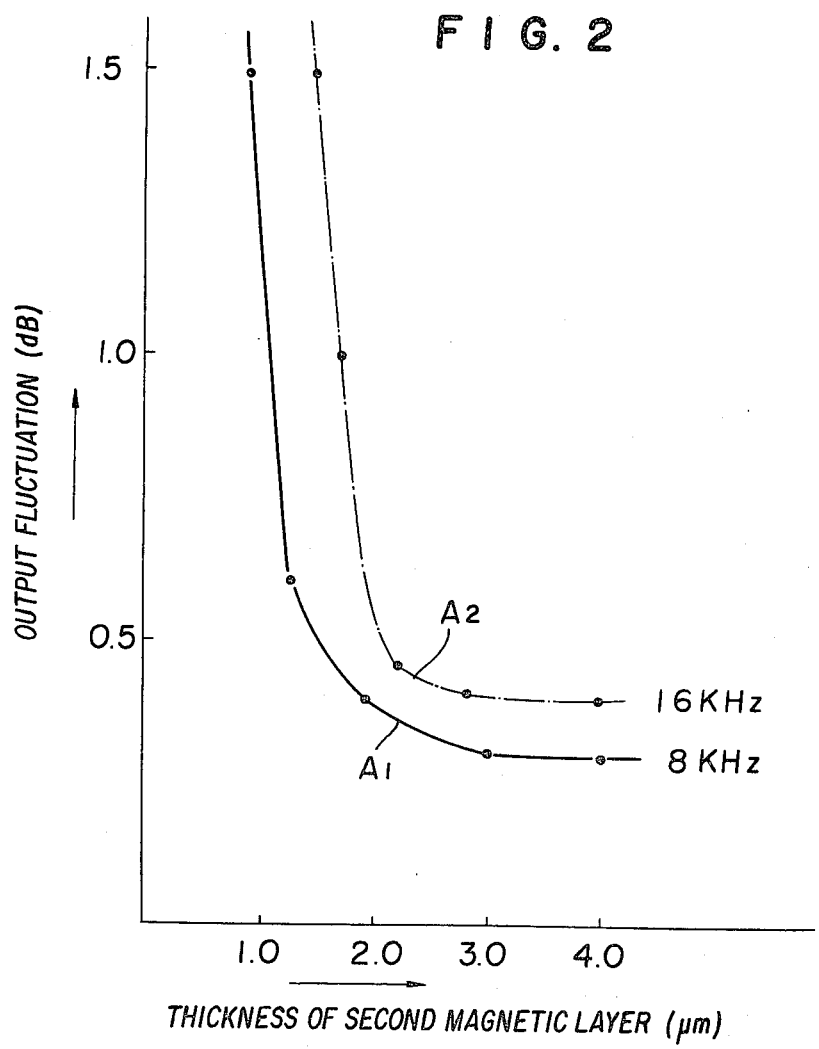
FIG. 2 is a characteristic diagram of output fluctuations to variation of a thickness of the second magnetic layer.

FIG. 2 shows the output fluctuation characteristics in variation of the thickness of the second magnetic layer (3) in the constant thickness of the first magnetic layer (2) (2.5μ). The thicknesses (μ) of the second magnetic layers (3) are plotted on the abscissa and the output fluctuations (dB) are plotted on the ordinate. The curve $A_1$ is the output fluctuation curve at 8 KHz and a curve $A_2$ is the output fluctuation curve at 16 KHz. As it is shown in FIG. 2, the output fluctuation is less than 0.5 dB to be no trouble in the practical application, if the thickness of the second magnetic layer is more than 1.5μ at the low frequency of 8 KHz. On the other hand, the thickness of the second magnetic layer must be at least 2.1μ to maintain the output fluctuation to be upto 0.5 dB at the high frequency of 18 KHz. Therefore, the thickness of the second magnetic layer is set to be at least 2.1μ in the present invention.

In the conventional two coated layer type magnetic recording medium, it has not considered to give the increased thickness of the second magnetic layer because the coercive force of the second magnetic layer is remarkably higher than that of the first magnetic layer and the frequency characteristics in the middle frequency range are distorted by increasing the thickness of the second magnetic layer.

In accordance with the present invention, the coercive force of the first magnetic layer is given in a range of 400 to 590 Oe and the coercive force of the second magnetic layer is given in a range of 590 to 800 Oe to give only small difference of the coercive forces of the first and second magnetic layers to prevent the distortion in the middle frequency range and the thickness of the second magnetic layer is given in a range of 2.1 to 2.8μ to reduce the output fluctuation in the high frequency range.

In the conventional cases, the magnetic powder having a coercive force of less than 400 to 500 Oe is used as disclosed in Japanese Unexamined Patent Publication No. 48504/1979. The coercive force of the magnetic powder can be increased to be the maximum of 590 Oe by increasing a content of the magnetic powder in the first magnetic layer to at least 81.1% in a thickness of about 2.1 to 2.8μ though the maximum coercive force in the conventional magnetic powder is 590 Oe. Thus, the high frequency characteristics can be further improved.

In the second magnetic layer, it is necessary to give at least 590 Oe to maintain excellent high frequency characteristics. In view of the magnetic record erasing, it is necessary to be upto about 800 Oe.

The relation of the contents of the magnetic powder and the thicknesses of the coated layer in the first magnetic layer is studied. As a result, it is found that the satisfactory low frequency characteristics are given in a thickness of the first magnetic layer of 2.1 to 2.8$\mu$ especially about 2.1$\mu$ if the content of the magnetic powder is at least 81.8% by weight. When the content of the magnetic powder is more than 81.8% and the thickness of the first magnetic layer is more than 3.0$\mu$, the coercive force is lowered to improve the low frequency characteristics. However, the distortion in the middle frequency range is caused. Therefore, the thickness of the first magnetic layer is in a range of 2.1 to 2.8$\mu$.

Figure 3:
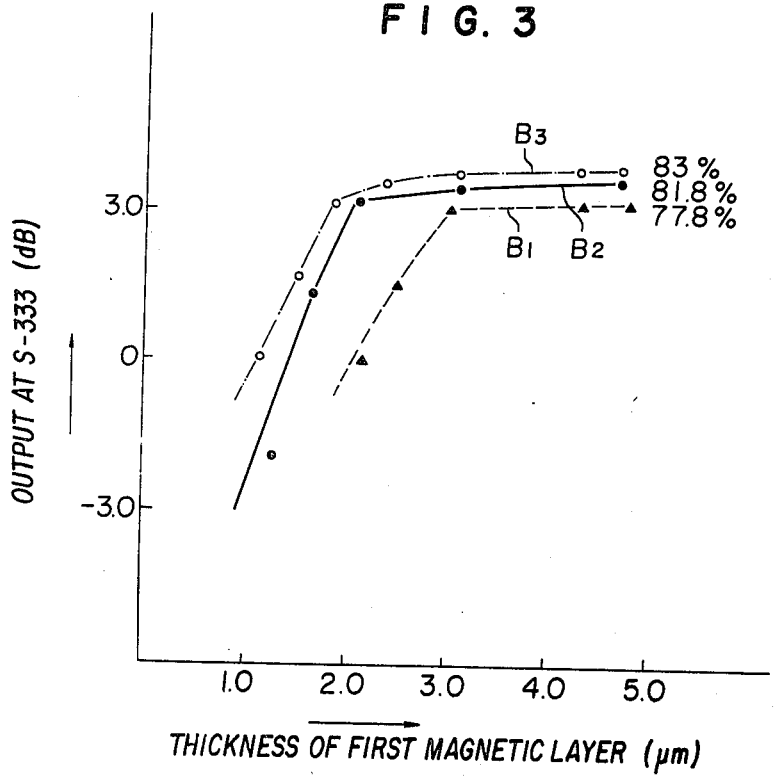
FIG. 3 is a characteristic diagram of low frequency characteristics to variation of a thickness of the first magnetic layer.

FIG. 3 is the characteristic diagram of the low frequency characteristics in the cases of various thickness of the coated layer. In FIG. 3, thicknesses of the first magnetic layer are plotted on the abscissa and the outputs at the flow frequency (S-333) are plotted on the ordinate. The curves $B_1$, $B_2$ and $B_3$ respectively show output characteristic curves at a content of the magnetic powder of 77.8%, 81.8% and 83%. As shown in FIG. 3, when the content of the magnetic powder is at least 81.8%, the output at the low frequency (S-333) can be more than 3(dB). When the content of the magnetic powder is upto 77.8%, the thickness of the layer must be at least 3$\mu$ to obtain the same output. The effect for improving the low frequency characteristics is attained by increasing the residual magnetic flux density resulted by the increase of the content of the magnetic powder. Thus, even though the thickness of the second magnetic layer is substantially the same as the thickness of the first magnetic layer, the two coated layer type magnetic recording medium having excellent characteristics can be obtained. As described above, the coercive force of the first magnetic layer can be improved to be 590 Oe from the maximum coercive force of 560 Oe in the conventional one. Therefore, the frequency characteristics at high frequency range is especially improved.

In accordance with the present invention, the two coated layer type magnetic recording medium having excellent characteristics of only small output fluctuation in the high frequency range without distortion in the middle frequency range superior to those of the conventional one can be obtained by controlling thickness of the first and second magnetic layers and the content of the magnetic powder in the first magnetic layer.

The magnetic powders, the binders and the substrates of the magnetic recording medium are described in many patent and patent applications filed by the applicants. These descriptions are referred except the above-mentioned conditions of the first and second magnetic layers.

The present invention will be illustrated by certain examples and references which are provided for purposes of illustration only and are not intended to be limiting the invention.

EXAMPLE

| | |
|---|---|
| Magnetic powder $\gamma$-Fe$_2$O$_3$ | 100 wt. parts |
| Vinyl chloride-vinyl acetate copolymer (Eslex A manufactured by Sekisui Kagaku Co.) | 10 wt. parts |
| Urethane prepolymer (Nippolan No. 2304 manufactured by Nippon Polyurethane Co.) | 10 wt. parts |
| Dispersing agent: lecithin | 5 wt. parts |
| Methyl ethyl ketone | 80 wt. parts |
| Methyl isobutyl ketone | 80 wt. parts |
| Toluene | 80 wt. parts |

A mixture of these components was kneaded in a ball mill for 36 hours and then, 3 wt.parts of a polyisocyanate (Colonate L manufactured by Nippon Polyurethane K.K.) was admixed to prepare a magnetic powder composition for the first magnetic layer. The composition was coated on a polyester film and the magnetic powder was orientated and the surface was dried and processed to give a thickness of the magnetic layer of 2.1 to 2.8$\mu$ and it was heat-treated at 60° C. for 48 hours to crosslink the binder. The first magnetic layer was formed.

| | |
|---|---|
| Magnetic powder Co-adsorbed $\gamma$-Fe$_2$O$_3$ | 100 wt. parts |
| Vinyl chloride-vinyl acetate copolymer (Eslex A manufactured by Sekisui Kagaku Co.) | 20 wt. parts |
| Urethane prepolymer (Nippolan No. 2304 manufactured by Nippon Polyurethane Co.) | 5 wt. parts |
| Dispersing agent: lecithin | 1 wt. parts |
| Methyl ethyl ketone | 100 wt. parts |
| Methyl isobutyl ketone | 100 wt. parts |
| Toluene | 100 wt. parts |

A mixture of these components was kneaded in a ball mill for 48 hours and then, 3 wt.parts of a polyisocyanate was admixed to prepare a magnetic powder composition for the second magnetic layer. The composition was coated on the first magnetic layer and the magnetic powder was orientated and the surface was dried and processed to give a thickness of the magnetic layer of at least 2.1$\mu$ to prepare each two coated layer type magnetic recording medium. The first magnetic layer had a coercive force of 560 Oe, a content of the magnetic powder of 83.4% and a thickness of 2.1$\mu$ and the second magnetic layer had a coercive force of 650 Oe and a thickness of 2.2$\mu$.

REFERENCE:

| | |
|---|---|
| Magnetic powder $\gamma$-Fe$_2$O$_3$ | 100 wt. parts |
| Vinyl chloride-vinyl acetate copolymer (Eslex A manufactured by Sekisui Kagaku Co.) | 13 wt. parts |
| Urethane prepolymer (Nippolan No. 2304 manufactured by Nippon Polyurethane Co.) | 12 wt. parts |
| Dispersing agent: lecithin | 5 wt. parts |
| Methyl ethyl ketone | 80 wt. parts |
| Methyl isobutyl ketone | 80 wt. parts |
| Toluene | 80 wt. parts |

In accordance with the process of Example, a magnetic powder composition was prepared by using these components and a first magnetic layer having a thickness of at least 3.0$\mu$ was formed on a polyester film.

In accordance with the process of Example, a second magnetic layer having a thickness of at least 1.5$\mu$ was formed on the first magnetic layer by using the same magnetic powder composition to prepare each two coated layer type magnetic recording medium. The first magnetic layer had a coercive of 560 Oe, a content of the magnetic powder of 80% and a thickness of 3.2μ and the second magnetic layer had a coercive force of 650 Oe and a thickness of 1.7μ.

Figure 4:
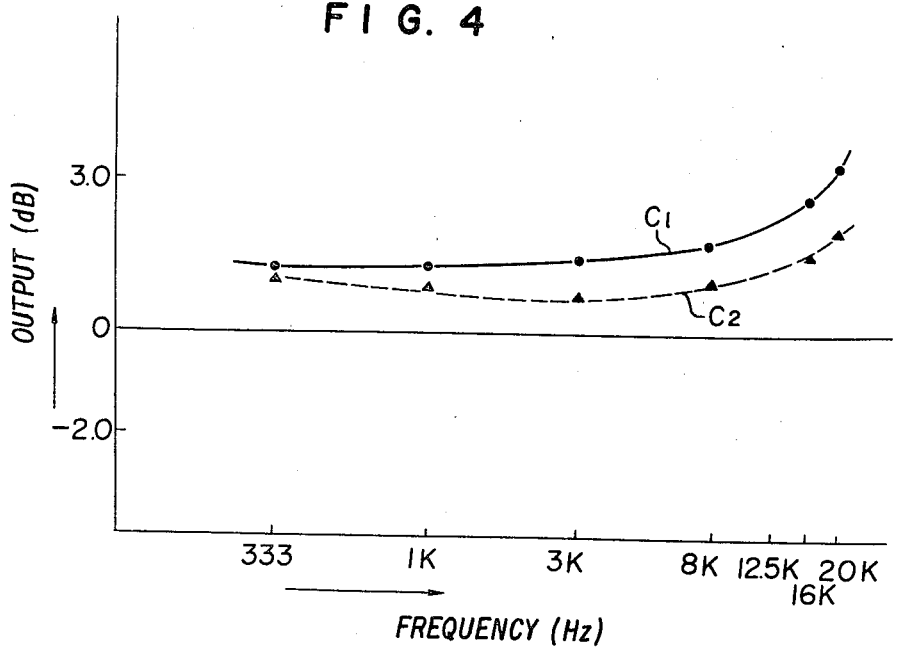
FIG. 4 is a characteristic diagram of frequency characteristics of Example of the present invention and Reference.

FIG. 4 shows the characteristic diagram of frequency-output characteristics in Examples and References. The frequencies Hz (logarithmic scale) are plotted on the abscissa and the outputs (dB) are plotted on the ordinate. The curve $C_1$ is the frequency characteristic curve of Example and the curve $C_2$ is the frequency characteristic curve of Reference. As shown in FIG. 4, the frequency characteristics of Examples are superior to those of References in the all frequency ranges. In the high frequency range, the frequency characteristics are remarkably improved. Moreover, the output fluctuation at high frequency of 16 KHz in Example was 0.45 (dB) in comparison with that of Reference of 1.0 (dB).

As described above, the first magnetic layer having a coercive force of 400 to 590 Oe and a thickness of 2.1 to 2.8μ is formed on the non-magnetic substrate and the second magnetic layer having a coercive force of 590 to 800 Oe and a thickness of 2.1μ is formed on the first magnetic layer in the magnetic recording medium of the present invention. Therefore, the two coated layer type magnetic recording medium having less output fluctuation in high frequency range than that of the conventional one and having no distortion in the middle frequency range is obtained.

We claim:

1. In a magnetic recording medium having two coated magnetic layers of a first magnetic layer and a second magnetic layer on a non-magnetic substrate, an improvement characterized in that said first magnetic layer has a coercive force of 400 to 590 Oe and a thickness of 2.1 to 2.8μ and said second magnetic layer has a coercive force of 590 to 800 Oe and a thickness of at least 2.1μ.

2. The magnetic recording medium according to claim 1 wherein said first magnetic layer has a content of a magnetic powder of at least 81.8% by weight.

* * * * *